United States Patent

[11] 3,602,547

| [72] | Inventor | Paul C. Tabor<br>Clawson, Mich. |
|---|---|---|
| [21] | Appl. No. | 14,917 |
| [22] | Filed | Feb. 27, 1970 |
| [45] | Patented | Aug. 31, 1971 |
| [73] | Assignee | Meteor Research Limited<br>Roseville, Mich. |

[54] SEAT BACK TILT CONTROL
9 Claims, 7 Drawing Figs.

| [52] | U.S. Cl. | 297/374, 297/379 |
|---|---|---|
| [51] | Int. Cl. | A47c 3/00 |
| [50] | Field of Search | 297/303, 333, 374, 327, 408, 355, 379; 248/383 |

[56] References Cited
UNITED STATES PATENTS

| 3,285,657 | 11/1966 | De Gaston | 297/374 |
| 3,322,461 | 5/1967 | Goldman et al. | 297/379 |

Primary Examiner—James C. Mitchell
Attorney—Bacon & Thomas

ABSTRACT: The lower edge of a seat back rests on a fulcrum at the rear edge of a seat frame and has downwardly extending arms pivoted to crankpins journaled on the seat frame and the angular positions of which determine the tilt of the seat back. A cylinder fixed to the crankpins is embraced by a helical torsion spring having one end anchored to the frame and serving to lock the seat back, in an infinite number of positions, against rearward tilting. Manual means can selectively release the spring from the cylinder to permit tilting the seat back rearwardly.

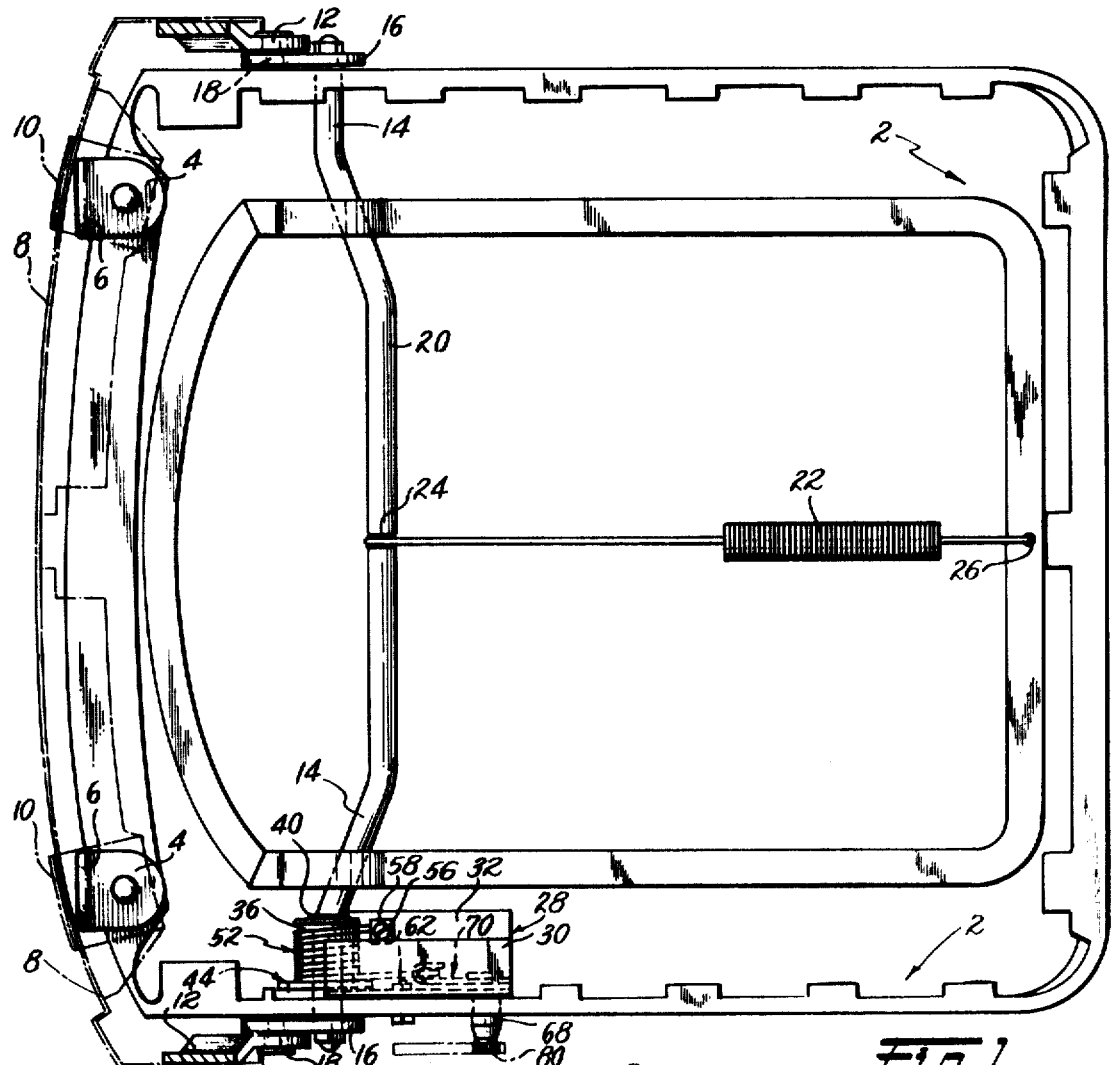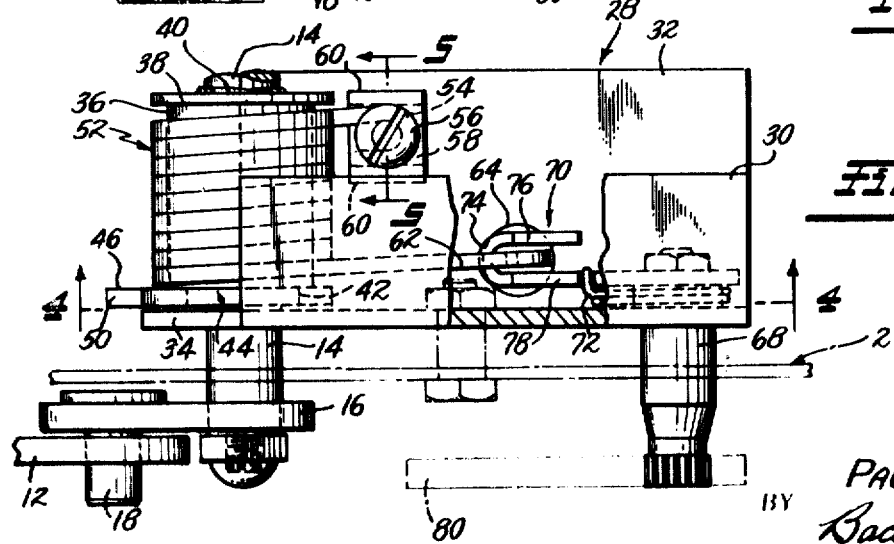

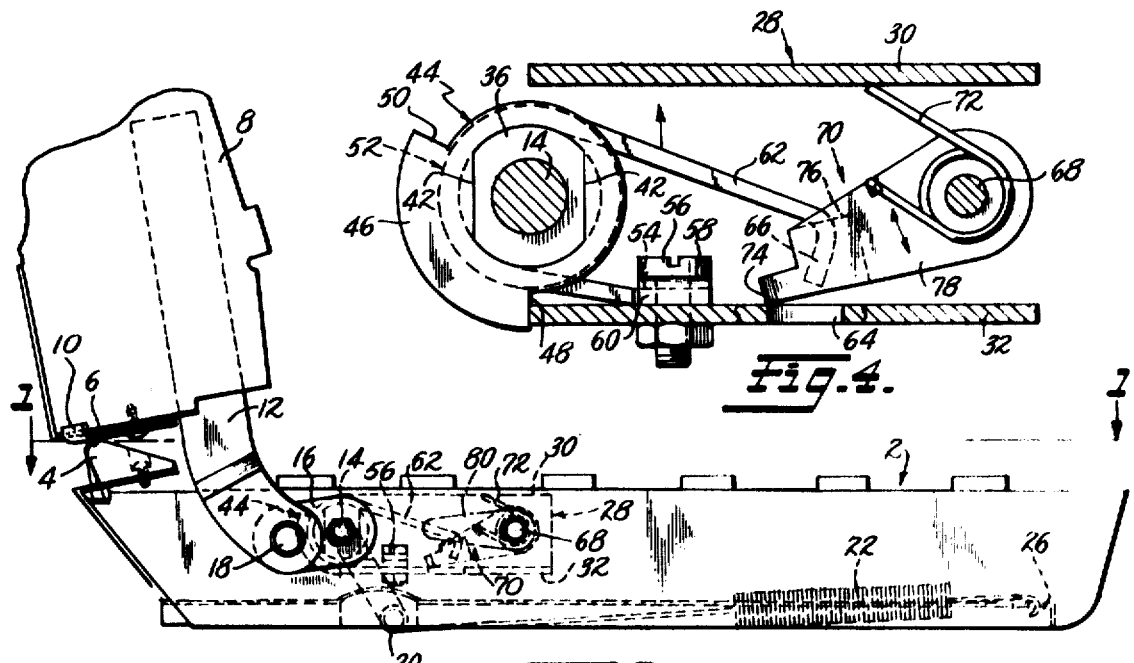
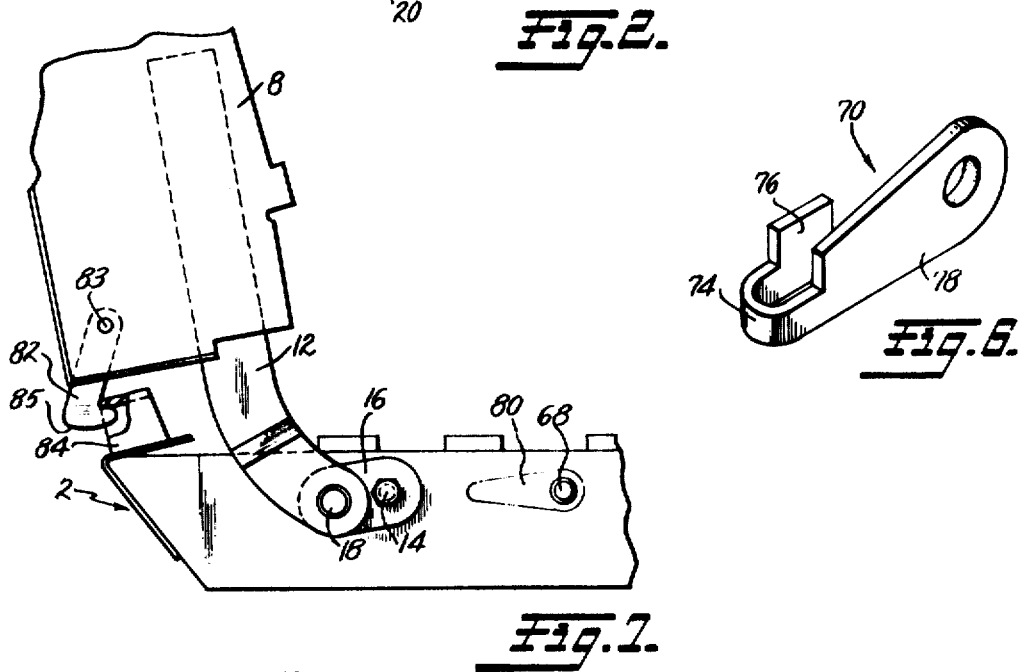
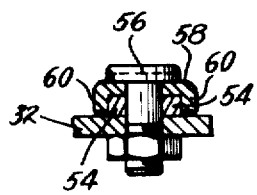

3,602,547

SEAT BACK TILT CONTROL

BACKGROUND OF THE INVENTION

This invention is in the field of seat-back tilt-controlling devices and particularly for such devices used with bucket seats in automotive vehicles.

It has been known heretofore to effect tilting-control of a seat back by rockably supporting the seat back on a seat frame and by connecting rigid downwardly extending arms on the seat back to crankpins rotatably about a transverse axis in the seat frame. Such prior devices, however, employed sector and pawl means to fix the position of the crankpin and thereby control the degree of tilt of the seat back. Such devices provided for only a limited number of tilted positions for the seat back.

SUMMARY OF THE INVENTION

The present invention relates to a seat-back tilt-control device of the type referred to above but wherein a one-way brake device enables rotary adjustment of a crankpin to an infinite number of positions whereby an infinite number of tilt angles may be controlled. The one-way brake mechanism comprises essentially a helical spring surrounding and frictionally engaging a cylindrical member rotatable with the crankpins, the helical spring being a self-energizing device for positively locking the crankpin against movement in a direction permitting rearward tilting of the seat back but permitting forcible forward tilting thereof. The invention also includes means for selectively releasing the frictional grip of the spring on the cylindrical member whereby to permit free tilting movement of the seat back in either direction. A return spring normally urges the crankpin to move in a direction to tilt the seat back forwardly but the return spring is not strong enough to overcome the normal frictional drag imposed by the helical spring. When the helical spring is released, however, the return spring will cause the seat back to tilt forwardly to a predetermined upright position.

BRIEF DESCRIPTION OF THE DRAWINGS

FIG. 1 is a plan view of a seat frame with portions of a seat-back structure and is a sectional view taken on the line 1—1 of FIG. 2; with portions of the seat back above the line 1—1 shown in phantom;

FIG. 2 is a fragmentary side elevational view of a seat construction embodying the present invention;

FIG. 3 is a plan view of a portion of the structure shown in FIG. 1, on an enlarged scale, with certain parts being broken away;

FIG. 4 is a vertical sectional view taken along the line 4—4 of FIG. 3;

FIG. 5 is a vertical sectional view taken on the line 5—5 of FIG. 3;

FIG. 6 is a perspective view of a release arm embodied in the present invention; and FIG. 7 is a fragmentary side view, similar to a portion of FIG. 2, but showing a latch.

DESCRIPTION OF THE PREFERRED EMBODIMENTS

Referring first to FIGS. 1 and 2, which illustrate the frame portions of a seat and seat back with the usual cushion and/or padding removed therefrom, numeral 2 indicates generally portions of the fixed frame defining a seat. As illustrated, the seat is a bucket seat of the type conventionally used in automotive vehicles. At its rear upper edge seat frame 2 is provided with a pair of fulcrum members 4 rigidly fixed thereto and each having a rounded crest portion 6. Numeral 8 designates the frame portion of a seat back having pad devices 10, of any suitable material, mounted on the lower edge thereof adjacent the rear surface of the seat back 8 and which pads rest freely and rockably on the corresponding fulcrum member 4 of the seat frame. The members 4 provide vertical support for the seat back 8 and also constitute fulcrums about which the seat back may be tilted in a forward and rearward direction. Fixed to opposite side edges of the seat back 8, in any suitable manner, is a pair of downwardly extending curved arms 12, which extend downwardly to positions adjacent the outer edges of the seat frame 2.

A transverse shaft 14 is journaled in opposite side portions of the seat frame 2 with its ends extending outwardly of that seat frame. Rigidly secured to each end of the shaft 14 is a crank arm 16 having a crankpin 18 adjacent its outer end, eccentric to the axis of shaft 14. The crankpins 18 are respectively journaled in the lower ends of the arms 12 previously described. It will thus be seen that rotation of the shaft 14 will cause crankpins 18 to rise or fall, depending upon the direction of rotation. It will furthermore be apparent that any vertical or forward and rearward movement of crankpins 18 will result in tilting of the seat back 8 about the crests of fulcrum members 4. Means to be described are provided for controlling the rotational position of the shaft 14 to thus fix the seat back 8 in a desired tilted position.

As shown best in FIGS. 1 and 2, the midportion 20 of the shaft 14 is offset from the axis of the ends of the shaft and a tension spring 22 has one end engaged in a groove 24 in the offset portion 20 and its other end anchored, at 26, to a fixed portion of the seat frame 2. As shown in FIG. 2 the offset portion 20 of shaft 14 extends generally downwardly and forwardly so that the bias applied by spring 22 tends to rotate the shaft 14 in a counterclockwise direction, as seen in FIG. 2, and thereby tends to move crankpins 18 downwardly and forwardly, which causes the seat back 8 to tilt forwardly. However, the strength of the spring 22 is not sufficient to overcome retaining means which will be described in greater detail later, until such retaining means are manually released.

A generally U-shaped bracket frame 28 is secured to the inner face of one side of seat frame member 2, as shown in FIGS. 1, 2 and 3, with upper and lower flanges 30 and 32 extending horizontally inwardly. The shaft 14 passes through an opening in the web portion 34 of the bracket 28. A cylindrical member 36 is fixedly secured to the shaft 14 and to a retaining washer 38, such as by welding, shown at 40 in FIG. 3. Adjacent its outer end the cylindrical member 36 is provided with opposed flat faces 42 (see FIG. 4) and a washerlike member 44, having a complementary opening therein embraces that portion of member 36 having the flat faces 42 whereby the washerlike member 44 is nonrotatable relative to the member 36 and shaft 14. A radially projecting sector 46 of washer 44 defines end abutments 48 and 50, respectively, engageable with the upper flange 30 or lower flange 32 of bracket frame 28 to thereby limit rotation of shaft 14 to a predetermined angular range, depending upon the angular extent of sector 46.

It will be evident, however, that in any position in which the crankpins 18 are fixed, the seat back 8 may be swung forwardly about the axis of crankpins 18 to cause the seat back to swing forwardly a distance greater than that that would be permitted by the abutments 48 and 50 without rotating the shaft 14. This permits free and easy forward swinging of the seat back 8 to provide ready access to the space behind the illustrated seat, which is necessary in certain types of automotive vehicles. When the seat back is thus swung forwardly pads 10 merely swing upwardly and away from fulcrum members 4.

The seat back 8 may then be swung rearwardly to the position illustrated without changing the position at which crankpins 18 are set.

A helical torsion spring 52 surrounds the cylindrical member 36, as shown. The spring 52 is preferably formed of square wire to provide maximum surface contact with the cylindrical member 36 and is coiled to a diameter when it is free of restraint, somewhat less than the outer diameter of cylindrical member 36. Thus, when the spring 52 is in relaxed condition on member 36 it tends to contract and grip cylindrical member 36 with a fairly tight frictional grip.

The inner end 54 of the spring 52 is of the hooked configuration shown in FIG. 3 and is secured by bolt 56 and U-shaped cap 58 to the lower flange 32 of frame bracket 28. The cap 58 is shown in section in FIG. 5 and its depending sides 60 embrace and confine the hooked end portions 54 of the spring 52 to prevent that hooked end from spreading when the spring is put under high tension. The outer or outer end of the spring 52 extends forwardly, as best seen in FIGS. 3 and 4, where it is identified by numeral 62. The free end 62 of the spring is normally free of engagement with any other structure so that it is free to rise or fall without restraint. Obviously, if the end 62 were to be forcibly lifted, as seen in FIG. 4, this would tend to unwind the spring 52 from cylinder 36, thus relieving its frictional grip on the cylinder and release the shaft 14 either for rotation under the influence of spring 52 or for rotation in the opposite direction to increase the rearward tilt of seat back 8. Release of the end 62 would then permit the natural resilience of the spring 52 to cause it to contract about cylinder 36 and frictionally hold the shaft 14 in the new position of adjustment. Any torque applied to shaft 14 in a direction tending to swing the seat back 8 rearwardly would cause the frictional engagement between cylinder 36 and spring 52 to tend to move free end 62 downwardly and thus more tightly wrap the spring on the cylinder. This action constitutes a positive lock against forcible rearward tilting of the seat back 8. The free end 62 of the spring 52 is thus left free of all restraint to permit the self-tightening action just described and the bottom flange 32 of bracket 28 is provided with an opening 64 therein providing clearance for a downturned end 66 of the spring whereby the spring may move downwardly, as seen in FIG. 4, through a substantial distance for self-energizing movement of the type described.

A release shaft 68 is journaled in the web portion 34 of bracket 28 and extends outwardly through an aligned opening in seat frame 2, as shown in FIG. 3. A release arm 70 is fixed to the inner end of the shaft 68 for forcible rotation therewith and a torsion spring 72 normally urges the arm 70 in a counterclockwise direction, as seen in FIG. 4, to hold its inner end 74 against the web of bracket 28. The arm 70 is provided with a return bend at its end 74 and a hook portion 76 spaced from the main leg 78 thereof. The return bend at 74 is relatively narrow, as clearly shown in FIG. 6, and the arm is so positioned that the free end 62 of the spring 52 and the downwardly directed end portion 66 thereof are positioned loosely between the main leg 78 and hook end 76 whereby to confine the free end 62 of the spring against unwarranted lateral displacement while permitting free and unrestrained vertical movement thereof when the parts are in the position shown in FIG. 4. It is contemplated that the outer end of the release shaft 68 be provided with any suitable manually operable handle 80 (see FIG. 3) keyed or splined thereon whereby the handle 80 may be manually actuated to rotate shaft 68 in a clockwise direction, as seen in FIG. 4, and against the action of torsion spring 72. This manual actuation will cause the end 74 of lever 70 to rise until it engages the free end 62 of spring 52. Continued manual rotation will then lift the free end of spring 52 to partially unwind that spring from cylinder 36 and thus release shaft 14 for free rotation in either direction. If no restraining forces are applied to the seat back 8, release of the spring 52 in the manner just described, would result in the spring 22 swinging the seat back 8 forwardly to a predetermined upright position wherein the shoulder 48 (FIG. 4) engages lower flange 32. This defines the maximum upright position of seat back 8 when it also rests on fulcrum member 4. On the other hand, upon release of the spring 52 in the manner described, a rearward force may be applied to the seat back 8 to cause it to tilt farther rearwardly, the degree of tilt being limited only by the shoulder 50 and upper flange 30. At any desired degree of rearward tilt of the seat back the handle 80 may be released, whereupon spring 72 returns lever 70 to the position of FIG. 4 and the resilience of spring 52 causes it to again contract on cylinder 36 and prevent further tilting of the seat back.

Previously herein there was described the free swinging or folding of the seat back 8 forwardly about crankpins 18 without changing the position of the latter. However, it is not desirable that the seat back be free to fold forwardly in that manner at all times and to prevent such movement inadvertently, the latch of FIG. 7 is provided. The latch shown comprises a latch 82 swingable about an axis at 83 and engageable with a keeper 84 secured to the seat frame 2. Means, not shown, are provided for swinging the latch 82 rearwardly free of the keeper 84 when it is desired to fold seat back 8 forwardly. When the seat back is then returned to the upright position shown, the lower edge 85 first engages the upper surface of keeper 84 and cams itself rearwardly far enough to drop into the engaged position shown in FIG. 7. When the latch 82 is in the engaged position shown it holds pads 10 against fulcrum members 4 so that a forward force of sufficient magnitude applied to the seat back 8 can forcibly rotate the shaft 14 in a counterclockwise direction, even without operating release handle 80, all as previously described.

While a single specific embodiment of the invention has been shown and described, it is to be understood that the same is merely illustrative of the principles involved and other embodiments may be resorted to.

I Claim:

1. A seat back tilt control mechanism comprising:
   a seat frame;
   a seat back having a lower edge portion resting loosely and tiltably on a fulcrum-defining rear portion of said seat frame for forward and rearward rocking movement;
   a downward extension on said seat back and having a lower end adjacent said seat frame;
   adjustable control means including a generally cylindrical rotary member on said seat frame and having a crankpin pivotally connected to said lower end;
   self-energizing friction means normally frictionally engaging said rotary member and being self-energizing to frictionally lock said rotary member against rotation in the one direction that would permit said seat back to tilt rearwardly but permitting forcible rotation thereof in the other direction; and
   selectively operable release means for releasing said self-energizing friction means whereby said seat back may be tilted rearwardly.

2. A control mechanism as defined in claim 1 including return-spring means biasing said rotary member to rotate in a direction tending to tilt said seat back forwardly, said return-spring means being not sufficiently strong to overcome the normal frictional restraint provided by said self-energizing friction means preventing free rotation of said member in the other direction, whereby said return spring means tilts said seat back forwardly only upon operation of said release means.

3. A control mechanism as defined in claim 1 wherein said self-energizing friction means comprises a helical torsion spring surrounding said member and being of a normal inner diameter less than that of said member; one end of said spring being fixed to said seat frame and other end thereof extending outwardly from said member and being free of securement to said member and frame.

4. A control mechanism as defined in claim 3 wherein said release means includes a movable element movable to swing the other end of said torsion spring to move said other end in a direction to unwind said torsion spring from said rotary member to release the normal frictional grip thereof on said rotary member.

5. A control mechanism as defined in claim 4 including yieldable means normally holding said release means free of engagement with said other end of said torsion spring.

6. A control mechanism as defined in claim 1 including cooperable positive stop means on said rotary member and said seat frame for limiting the rotary movement of said member to a predetermined angular range.

7. A control mechanism as defined in claim 2 wherein said seat back is provided with one of said downward extensions at each lateral side thereof; said rotary member including a shaft portion extending laterally across said downward extensions, and an intermediate portion of said shaft being laterally offset from the axis thereof; said return-spring means being connected to said offset portion of said shaft.

8. A control mechanism as defined in claim 6 wherein said fulcrum-defining portion is substantially rearward of said crankpin whereby said seat back may be manually swung forwardly about said crankpin through an angle greater than said predetermined angular range.

9. A control mechanism as defined in claim 1 including selectively releasable latch means normally holding said lower edge portion against upward separation from said fulcrum-defining portion.